United States Patent [19]

Wilson

[11] Patent Number: 4,764,002
[45] Date of Patent: Aug. 16, 1988

[54] BALANCED OPTICAL SYSTEM
[75] Inventor: Andrew L. Wilson, Currie, Scotland
[73] Assignee: Ferranti, plc, Cheadle, England
[21] Appl. No.: 108,067
[22] Filed: Oct. 14, 1987
[30] Foreign Application Priority Data
Oct. 23, 1986 [GB] United Kingdom ............... 8625392
[51] Int. Cl.⁴ ............................................. G02B 26/10
[52] U.S. Cl. ..................................... 350/486; 350/6.6
[58] Field of Search ..................... 350/486, 500, 6.6
[56] References Cited
U.S. PATENT DOCUMENTS
4,439,003 3/1984 Roth ..................................... 350/6.6

Primary Examiner—John K. Corbin
Assistant Examiner—Rebecca D. Gass
Attorney, Agent, or Firm—Kerkam, Stowell, Kondracki & Clarke

[57] ABSTRACT

An optical element (10) is pivoted for limited rotation about an axis (12). An actuator arm (14) is rotatable by an actuator (13) about an axis (15) and is connected to the optical element by a first link (16). A second link (21) connects the actuator arm (14) to a balance arm (18) which carries a balance mass (20) and is pivoted about an axis (19). The arrangement is such that the line (23) joining the axis (12) of the optical element to the point of connection between the first link (16) and the optical element (10) is always parallel to the line (24) joining the axis (19) of the balance arm (18) to the point of connection between the balance arm and the second link (21).

4 Claims, 2 Drawing Sheets

BALANCED OPTICAL SYSTEM

This invention relates to optical systems having a movable element which requires to be statically balanced.

Many optical systems have a movable element, such as a mirror or prism, which has to be balanced so that the element will remain in any position into which it is moved. One example of such an optical system is that used to provide a stabilised optical sight-line, and includes a mirror movable in response to movements of a stabilising gyroscope. Commonly, as described for example in British Pat. No. 1,320,711 a mirror is pivoted about a central axis and is driven directly by the gyroscope through a belt or cable drive. Other drive mechanisms may be used, such as gears, or the lever mechanism described in British Pat. No. 1,236,807.

More recently it has become common to move the mirror by means of a motor, with a pickoff on the gyroscope providing the necessary electrical signals. Motors and other electrical actuators have been used frequently to move optical elements in other situations.

Mechanical drive arrangements have always suffered from problems due to vibration and backlash, and adequate balancing has often been difficult to achieve. With electrical actuators the problem has been one of producing adequate torque to move the optical element whilst providing a balanced system. This problem becomes more acute as the size of the optical element increases.

It is an object of the invention to provide a balanced movable optical system having an improved arrangement for providing the necessary movement.

According to the present invention there is provided a balanced optical system comprising an optical element pivoted for rotation through a limited angle about an element axis, actuator means including an actuator arm rotatable by an actuator about an actuator axis parallel to the element axis, a first link connecting a first point on the actuator arm on one side of the actuator axis to a point on the optical element spaced apart from the element axis, a balance arm carrying a balance mass and pivoted for rotation about a balance arm axis parallel to the element axis, and a second link connecting a point on the balance arm spaced apart from the balance arm axis to a second point on the actuator arm on the opposite side of the actuator axis from the first point, the arrangement being such that the line joining the element axis to the point of connection of the first link to the optical element is parallel to the line joining the balance arm axis to the point of connection of the second link to the balance arm in all positions of the optical element such that the optical system is statically balanced.

The invention will now be described with reference to the accompanying drawings, in which.

Figure 1:
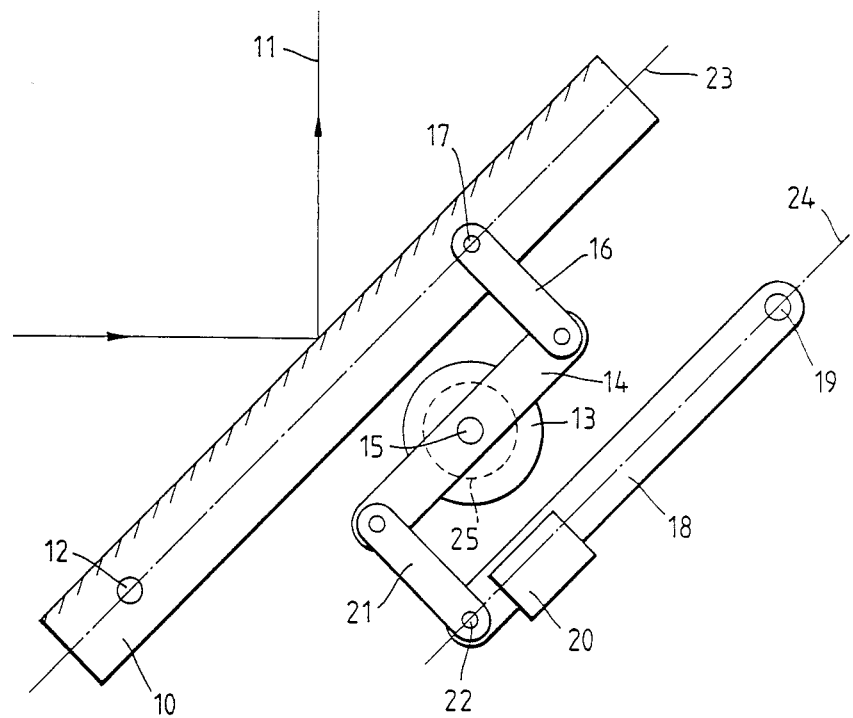
FIG. 1 illustrates a first embodiment of the invention.

Referring now to FIG. 1, this shows a mirror 10 used to deflect an optical sight line 11 through an angle which may be varied on either side of the 90° angle shown. The mirror is pivoted about a mirror axis 12.

Actuator means for moving the mirror comprise a rotatable actuator 13, such as a stepping motor or servomotor, and an actuator arm 14 which is rotatable by the actuator 13 about an actuator axis 15 which is parallel to the mirror axis 12. The actuator arm is connected to the mirror by a first link 16 attached to one end of the actuator arm 14 and to the mirror at a point 17 spaced apart from the mirror axis 12.

A balance arm 18 is also provided, pivoted about an axis 19, again parallel to the mirror axis 12, and carrying a balance mass 20. The balance arm 18 is connected to the actuator arm 14 by a second link 21 attached to the other end of the actuator arm 14 and to the free end of the balance arm 18 at a point 22.

The lengths of the arms and links, and the positions of the pivot points have to be such as to satisfy one essential condition. This is that the line joining mirror axis 12 to connecting point 17 on the mirror (shown as broken line 23) must be parallel to the line joining the balance arm axis 19 to the connecting point 22 on the balance arm 18 (shown as broken line 24) for all positions of the mirror. In addition the balance mass 20 must be positioned such that the optical system is statically balanced.

Figure 2:
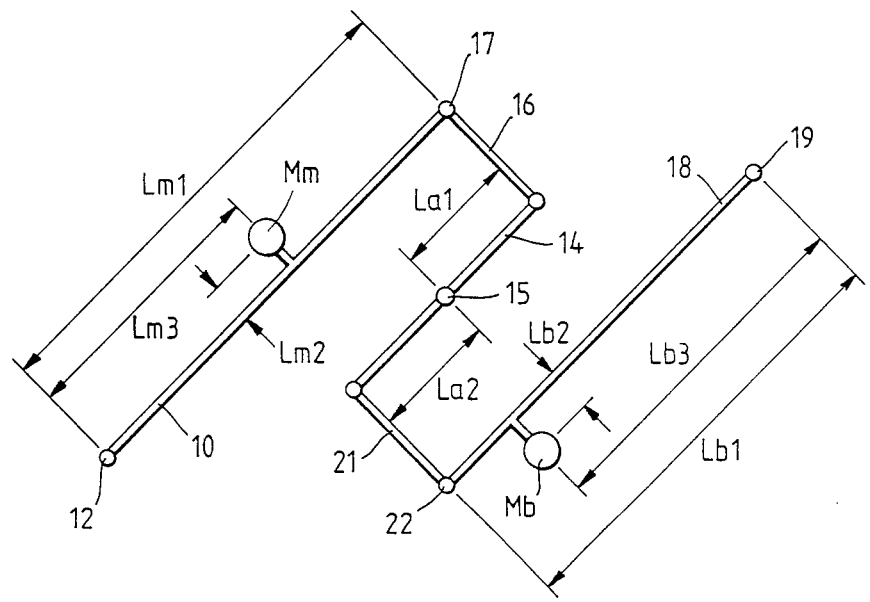
FIG. 2 is a schematic diagram illustrating the principle of operation of the embodiment of FIG. 1.

FIG. 2 illustrates the principle on which the dimensions of the various parts of the system may be determined. The parts and links are shown by single lines representing the lines joining the pivot points on each part.

Referring now to FIG. 2, the optical element 10 has a length between the pivot 12 and the point of connection 17 of link 16 which is designated Lm1. The optical element 10 has a mass Mm and the centre of mass is shown as being offset from the line joining points 12 and 17 by a distance Lm2 at a distance Lm3 from the pivot 12. Actuator arm 14 is shown as having a length La1 between its pivot 15 and its connection with link 16, and a length La2 between its pivot 15 and its connection with link 21.

Balance arm 18 has a length Lb1 between pivot 19 and its point of connection 22 with link 21. The balance arm has a mass, including balance mass 20, of Mb and its centre of mass is shown as being offset from the line joining points 19 and 22 by a distance Lb2 at a distance Lb3 from the pivot 19.

The position of the balance mass 20, that is the dimensions Lb2 and Lb3, have to be determined for static balance to be maintained, and this is done as follows:

It is initially assumed that the masses of links 16 and 21 may be neglected.

It may be shown that balance is only maintained for displacements of the optical element 10 from its centre position if the lines 23 and 24 of FIG. 1 remain parallel at all times. This condition is met if $$La1/Lm1 = La2/Lb1 \quad (1)$$

If one considers a pair of orthogonal axes x and y as shown in FIG. 2, then considering linear acceleration applied parallel to the y axis and taking moments about the actuator arm pivot 15, the condition for zero moment is:

$$Mm \times (Lm3/Lm1) \times La1 = Mb \times (Lb3/Lb1) \times La2 \quad (2)$$

Considering linear acceleration applied parallel to the x axis, the corresponding condition is:

$$Mm \times (Lm2/Lm1) \times La1 = Mb \times (Lb2/Lb1) \times La2 \quad (3)$$

substituting equation (1) in equations (2) and (3) gives $$Mm \times Lm3 = Mb \times Lb3$$

and $$Mm \times Lm2 = Mb \times Lb2$$

From these the position and value of the balance mass 20 may be determined.

In the arrangement shown La1=La2 and Lm1=Lb1. If either one of these relationships is varied then the other must also be changed as it is essential to maintain the relationship expressed by equation (1). It is also necessary to have the lengths of links 16 and 21 arranged so that lines 23 and 24 are always parallel.

It will be clear from the above description that the mirror used in the embodiment described may be pivoted at any convenient point. Also, although the use of a mirror is described, the optical element may be of any type which may be required to be moved about a pivot so as to produce a desired optical effect.

The optical system described above may also be dynamically balanced, that is balanced under conditions of angular, as opposed to linear, acceleration forces. It may be shown mathematically that, for the angular momentum of the system to be independent of the angular position of the mirror 10, the inertia Ja of the actuator about its axis of rotation is given by the expression $$Ja = \frac{Jm + Jb}{Na - 2}$$

where Jm and Jb are the inertias of the mirror 10 and the balance mass 20 about their respective axis of rotation and Na is the velocity ratio relating the movement of the mirror 10 to that of the actuator arm 14. At the position of the optical system where the actuator arm 14 is in its centre position the ratio Na is given by:

$$Na = Lm1/Lma$$

where Lm1 and Lma are the lengths shown in FIG. 2.

Hence it is possible to calculate the necesssary inertia of the actuator 13, and actuator shaft to add one or more balance discs, as shown in broken line at 25 in FIG. 1, to the actuator shaft to increase the actuator inertia to the necessary value to achieve dynamic balance. The velocity ratio Na actually varies as the optical system moves away from the centre position. However, the angular movement of the optical system is limited and the degradation in the dynamic balancing that results is small. Static balance is maintained for all positions of the optical system.

I claim:

1. A balanced optical system comprising an optical element pivoted for rotation through a limited angle about an element axis, actuator means including an actuator arm rotatable by an actuator about an actuator axis parallel to the element axis, a first link connecting a first point on the actuator arm on one side of the actuator axis to a point on the optical element spaced apart from the element axis, a balance arm carrying a balance mass and pivoted rotation about a balance arm axis parallel to the element axis, and a second link connecting a point on the balance arm spaced apart from the balance axis to a second point on the actuator arm on the opposite side of the actuator axis from the first point, the arrangement being such that the line joining the element axis to the point of connection of the first link to the optical element is parallel to the line joining the balance axis to the point of connection of the second link to the balance arm in all positions of the optical element such that the optical system is statically balanced.

2. An optical system as claimed in claim 1 which includes a balance disc carried on the actuator axis for rotation with the actuator arm, the balance disc being arranged such that in at least one position of the optical element the optical system is dynamically balanced.

3. An optical system as claimed in claim 2 in which the optical element is movable about said one position between first and second limits.

4. An optical system as claimed in claim 1 in which the optical element is a mirror arranged to stabilize an optical sight-line.

* * * * *